(12) United States Patent
Sare et al.

(10) Patent No.: US 7,611,575 B2
(45) Date of Patent: Nov. 3, 2009

(54) HIGH SOLIDS, LARGE PARTICLE, CALCINED KAOLIN SLURRIES

(75) Inventors: Edward J. Sare, Macon, GA (US); Tommy L. Adkins, Cochran, GA (US); Stephen C. Raper, Byron, GA (US)

(73) Assignee: Imerys Pigments, Inc., Roswell, GA (US)

( * ) Notice: Subject to any disclaimer, the term of this patent is extended or adjusted under 35 U.S.C. 154(b) by 274 days.

(21) Appl. No.: 10/518,792

(22) PCT Filed: Dec. 1, 2003

(86) PCT No.: PCT/US03/35984

§ 371 (c)(1), (2), (4) Date: Sep. 1, 2005

(87) PCT Pub. No.: WO2004/050773

PCT Pub. Date: Jun. 17, 2004

(65) Prior Publication Data

US 2006/0169174 A1 Aug. 3, 2006

(51) Int. Cl.
- C04B 16/08 (2006.01)
- C04B 20/00 (2006.01)
- C04B 38/00 (2006.01)
- C08K 5/00 (2006.01)
- C09D 11/06 (2006.01)
- C11C 3/00 (2006.01)
- C04B 33/00 (2006.01)

(52) U.S. Cl. ............ 106/678; 106/503; 106/504; 106/505; 106/484; 106/485; 106/486; 106/487; 106/312; 106/499; 106/288; 106/468; 106/501.1; 501/141; 501/147; 501/148; 209/5; 162/181.5; 162/181.8

(58) Field of Classification Search ......... 106/503–505, 106/678, 312, 484–487, 499, 288, 468, 501.1; 501/141, 147–148; 162/181.5, 181.8; 209/5
See application file for complete search history.

(56) References Cited

U.S. PATENT DOCUMENTS

| | | | |
|---|---|---|---|
| 3,021,195 A | | 2/1962 | Podschus et al. |
| 3,309,214 A | * | 3/1967 | Podschus et al. ............ 106/486 |
| 3,372,043 A | | 3/1968 | Fanselow |
| 3,754,712 A | * | 8/1973 | Cecil ......................... 241/16 |
| 3,801,332 A | * | 4/1974 | Cadmus ..................... 106/18 |
| 4,118,245 A | | 10/1978 | Hamill et al. |
| 4,118,247 A | | 10/1978 | Marchetti et al. |
| 4,374,203 A | | 2/1983 | Thompson et al. |
| 4,423,118 A | * | 12/1983 | Corbett et al. ............. 428/514 |
| 4,686,260 A | * | 8/1987 | Lindemann et al. ......... 524/458 |
| 4,693,427 A | | 9/1987 | Bilimoria et al. |
| 4,716,186 A | * | 12/1987 | Portnoy et al. .............. 524/50 |
| 5,028,268 A | | 7/1991 | Ince et al. |
| 5,034,062 A | | 7/1991 | Lein et al. |
| 5,232,881 A | | 8/1993 | Wu |
| 5,282,898 A | | 2/1994 | Wu |
| 5,320,897 A | * | 6/1994 | Kondo et al. ............ 428/32.36 |
| 5,393,340 A | * | 2/1995 | Slepetys et al. ............ 106/484 |
| 5,424,259 A | | 6/1995 | Yordan et al. |
| 5,537,934 A | | 7/1996 | Jensen et al. |
| 5,543,372 A | | 8/1996 | Shi et al. |
| 5,718,756 A | * | 2/1998 | Mohler ..................... 106/486 |
| 5,799,978 A | * | 9/1998 | Grinnell ..................... 281/29 |
| 6,103,005 A | | 8/2000 | Sare et al. |
| 6,150,289 A | * | 11/2000 | Chen et al. ................ 501/148 |
| 6,171,702 B1 | * | 1/2001 | Malhotra et al. .......... 428/411.1 |
| 6,334,894 B1 | * | 1/2002 | Kostuch .................... 106/486 |
| 6,554,892 B1 | | 4/2003 | Constantin et al. |
| 2001/0051230 A1 | * | 12/2001 | Colton et al. .............. 427/508 |
| 2003/0141224 A1 | * | 7/2003 | Pruett et al. ................. 209/5 |
| 2003/0177952 A1 | * | 9/2003 | Cummings et al. ......... 106/468 |

FOREIGN PATENT DOCUMENTS

GB 1 600 862 A 10/1981

* cited by examiner

*Primary Examiner*—Michael A Marcheschi
*Assistant Examiner*—Pegah Parvini
(74) *Attorney, Agent, or Firm*—Finnegan, Henderson, Farabow, Garrett & Dunner, L.L.P.

(57) ABSTRACT

The present invention relates to coarse calcined kaolin slurries having a high solids content. The invention also relates to methods of making such slurries. The resulting slurries can have a solids content of at least about 58% by weight wherein at least about 40% by weight of the calcined kaolin particles has a particle size of at least about 1 μm. The slurries can be stabilized where the solids show little settling from suspension. The slurries have many uses, including fillers or extenders in paint and coating compositions for paper or paper board. More generally, the inventive products may be used wherever calcined kaolins are used. The present invention also related to coarse calcined kaolin slurries having a multimodal particle size distribution and a high solids content.

33 Claims, No Drawings

HIGH SOLIDS, LARGE PARTICLE, CALCINED KAOLIN SLURRIES

The present invention relates to coarse calcined kaolin slurries having a high solids content, their production, and use. The resulting slurries can have a solids content of at least about 58% by weight, wherein at least about 40% by weight of the calcined kaolin has a particle size of at least about 1 μm. The slurries have many uses, including as fillers or extenders in paint and coating compositions. More generally, the inventive products may be used wherever calcined kaolins are used.

Particulate kaolins occur naturally in the hydrous form, and exist as crystalline structures linked together by hydroxyl-containing moieties. Particulate kaolins may be converted to a calcined form by thermal processes. Such processes cause the particulate kaolin to dehydroxylate and aggregate, so that the kaolin converts from a crystalline to an amorphous form.

Calcined kaolins can be used to improve the opacity of a pigment. Calcined kaolins find widespread use as pigments in paints, plastics, rubbers, sealants, and as raw materials for ceramics, cementitious products and other application compositions. As flattening (or matting) agents in paints and coatings, they can help control the gloss and sheen of the surfaces of the substrates to which they are applied. As opacifiers, they can impart opacity, whiteness, and other desirable optical properties. As extenders, they can allow partial replacement of titanium dioxide and other more expensive pigments with minimal loss of whiteness or opacity.

Generally, the properties of kaolin pigments are influenced by the morphology of the particles that make up the pigment. Kaolin particle morphology for both hydrous and calcined kaolins can be influenced by such factors as the size (expressed in terms of particle size distribution, or PSD, and particle size), shape, and texture of the individual particles and of agglomerates thereof.

The present invention relates to coarse calcined kaolin slurries having a high solids content.

One aspect of the invention provides a composition comprising a slurry comprising calcined kaolin. At least about 40% by weight of the calcined kaolin has a particle size of at least about 1 μm, and the slurry has a solids content of at least about 58% by weight, relative to the total weight of the slurry.

Another aspect of the invention provides a method of preparing a slurry comprising:

(a) providing a calcined kaolin, wherein at least about 40% by weight of the calcined kaolin has a particle size of at least about 1 μm;

(b) combining the calcined kaolin with water; and (c) obtaining a slurry having a solids content of at least about 58% by weight, relative to the total weight of the slurry.

Another aspect of the present invention provides a method of preparing a slurry having a solids content of at least about 58% by weight, relative to the weight of the slurry, comprising providing a calcined kaolin, wherein at least about 40% by weight of the calcined kaolin has a particle size of at least about 1 μm, and the calcined kaolin has not been subjected to mechanical grinding; and introducing the calcined kaolin to water.

Another aspect of the present invention provides a paint composition comprising a slurry comprising calcined kaolin, wherein at least about 40% by weight of the calcined kaolin has a particle size of at least about 1 μm, and the slurry has a solids content of at least about 58% by weight, relative to the total weight of the slurry.

Another aspect of the present invention provides a method of making a coated paper or coated paper board. The method, comprises coating a fibrous substrate with slurry, the slurry comprising calcined kaolin wherein at least about 40% by weight of the calcined kaolin has a particle size of at least about 1 μm, and the slurry has a solids content of at least about 58% by weight, relative to the total weight of the slurry.

In one aspect of the present invention, there is provided a composition comprising a slurry comprising calcined kaolin. In this aspect, the slurry can have a solids content of at least about 58% by weight, relative to the total weight of the slurry. According to another aspect of the invention, the slurry has a solids content of at least about 60% by weight, relative to the total weight of the slurry. At least about 40% by weight of the calcined kaolin can have a particle size of at least about 1 μm.

Kaolin slurries having a high solids content are generally desired because the minimized volume of slurry allows for ease of handling and reduction of transport costs. Thus, minimal volumes of such higher density kaolin slurries can be useful in products containing these slurries.

It is an unexpected discovery that a high solids content slurry can be obtained with a coarse calcined kaolin, i.e., wherein at least about 40% by weight of the calcined kaolin has a particle size of at least about 1 μm. Particle sizes, and other particle size properties referred to in the present application, are measured in a well-known manner by, e.g., sedimentation of the particulate material in a fully dispersed condition in an aqueous medium using a SEDIGRAPH 5100 instrument as supplied by Micromeritics Corporation. All particle size data measured and reported herein, including in the examples, were taken in a known manner, with measurements made in water at the standard temperature of 34.9° C. All percentages and amounts expressed herein are by weight. All amounts, percentages, and ranges expressed herein are approximate.

According to one aspect of the invention, at least about 40% by weight of the calcined kaolin has a particle size of at least about 1 μm. According to another aspect of the invention, at least about 40% by weight of the calcined kaolin has a particle size ranging from about 1 μm to about 10 μm. In yet another aspect of the invention, the calcined kaolin comprises at least about 45% by weight, such as an amount of at least about 50% by weight, of particles having a particle size of at least about 1 μm. In yet another aspect, the calcined kaolin comprises at least about 40% particles by weight having a particle size of at least about 2 μm, such as an amount of at least about 45% by weight having a particle size of at least about 2 μm, or an amount of at least about 50% by weight having a particle size of at least about 2 μm.

"Calcined kaolin" as used herein refers to a kaolin that has been converted from the corresponding (naturally occurring) hydrous kaolin to the dehydroxylated form by thermal methods. Calcination changes, among other properties, the kaolin structure from crystalline to amorphous. Calcination is effected by heat-treating coarse or fine hydrous kaolin in known manner, e.g., at temperatures ranging from 500° C. to 1200° C., such as temperatures ranging from 800° C. to 1200° C.

The degree to which hydrous kaolin undergoes changes in crystalline form can depend upon the amount of heat to which the hydrous kaolin is subjected. Initially, dehydroxylation of the hydrous kaolin can occur upon exposure to heat. At temperatures below a maximum of about 850-900° C., the product is often considered to be virtually dehydroxylated, with the resultant amorphous structure commonly referred to as a metakaolin. Frequently, calcination at this temperature is referred to "partial calcination," and the product may also be referred to as "partially calcined kaolin." Further heating to temperatures above about 900-950° C. can result in further structural changes, such as densification. Calcination at these higher temperatures is commonly referred to as "full calcination," and the product is commonly referred to as 'fully calcined kaolin'.

Additional calcination may cause formation of mullite. Mullite concentrations on the order of from about 2% to about 3% (by weight) in the composition according to the invention may be useful in some end-use applications, such as catalyst substrates. In one embodiment, the calcined kaolin comprises mullite. "Calcined" (or "calcination"), as used in herein, may encompass any degree of calcination, including partial (meta) and/or full and/or flash calcination.

According to one aspect of the invention, the composition comprising the calcined kaolin slurry further comprises at least one thickener (also commonly referred to as a viscosity modifier). Thickeners can be present in the composition in an amount effective to thicken or stabilize the slurry, for example in an amount ranging from about 0.01% to about 4% by weight, relative to the total weight of the slurry, such as an amount ranging from about 0.01% to about 2% by weight, relative to the total weight of the slurry.

Any art recognized thickener may be used. Suitable non-limiting examples of appropriate thickeners include, but are not limited to, cellulosic thickeners, montmorillonite or smectite clays such as bentonite, hydrophobically modified ethoxylated urethanes (HEUR), polyacrylates, polyvinyl pyrrolidone, sodium alginate, xanthan gum, silica thickeners, sodium magnesium silicate (e.g., Laponite®), acrylic acid copolymers, nonionic hydrophobically modified polyethers (e.g. Aquaflow®) and mixtures thereof.

Cellulosic thickeners have a polymeric backbone of cellulose having a repeating unit of anhydroglucose. Cellulose ethers form a class of cellulosic thickeners. Suitable non-limiting examples of cellulose ethers useful according to the invention include alkyl celluloses, carboxymethyl celluloses (CMC), ethylhydroxyethyl celluloses celluloses, hydroxymethyl celluloses (HMC), hydroxyethyl celluloses (HEC), and hydroxypropyl celluloses. Examples of cellulose ethers-include METHOCEL® A (Dow Chemical Company, Midland, Mich.), which is a methylcellulose, and METHOCEL® E, F, J, and K, which are hydroxypropyl products where propylene oxide is used, in addition to methyl chloride, to obtain hydroxypropyl substitution on the anhydroglucose units of the cellulose backbone. Other cellulosic thickeners include Acrysol® DR-73 (Rohm and Haas, Philadelphia, Pa.) and Acrysol® TT-935 (Rohm and Haas, Philadelphia, Pa.). Exemplary hydroxyethyl celluloses include ethylhydroxyethyl celluloses, which can be obtained as BERMOCOLL® products (Akzo Nobel).

Exemplary xanthan gums include Kelzan® xanthan gum products (CP Kelko US, Wilmington, Del.), Kelzan®, Kelzan® AR, Kelzan® ASX, Kelzan® ASX T, Kelzan® CC, Kelzan® HP, Kelzan® RD, Kelzan® S, Kelzan® ST, Kelzan® T, Kelzan® XLC, and Kelfo®.

Exemplary sodium magnesium silicates include the Laponite® products (Southern Clay Products, Gonzales, Tex.), such as Laponite® XLG.

An exemplary hydrophobically modified ethoxylated urethane thicker is Acrysol® SCT-275 (Rohm and Haas, Philadelphia, Pa.), which is a nonionic HEUR associative thickener.

Exemplary nonionic hydrophobically modified polyethers include the Aquaflow® rheology modifiers (Hercules, Wilmington, Del.), such as Aquaflow® NLS 200 or Aquaflow® NHS 300.

An exemplary polyacrylate is Carbopol®, a high molecular weight, crosslinked, acrylic acid-based polymer.

In one embodiment, the at least one thickener is Acrysol® DR-73. In another embodiment, the at least one thickener is a blend comprising 10 parts Acrysol® SCT-275 and 1 part Acrysol® TT-935.

In one embodiment, the slurry further comprises at least one biocide. Biocides are generally present in the composition at levels up to about 1% by weight, such as an amount ranging from about 0.01% to about 1% by weight, relative to the total weight of the slurry. Any art recognized biocide/spoilage prevention agent may be used, such as quaternary ammonium compounds, organosulphur compounds, and halogen-containing compounds. Appropriate biocides include, but are not limited to, metaborate, sodium dodecylbenzene sulphonate, sodium benzoate, benzisothiazolin, isothiazolin, thione, glutaraldehyde, bromonitropropanediol, bromohydroxyacetophenone, dibromodicyanobutane, sodium orthophenylphenate, dodecylguanidine hydrochloride, oxazolidines, adamantanes, hydantoins, dibromonitrilopropionamide, bromonitrostyrene, methylenebisthiocyanate, tetrakis hydroxymethyl phosphonium sulfate, sodium dimethyldithiocarbamate, chloromethylphenol, and other compounds sold commercially for this function.

Benzisothiazolin can be obtained as a Proxel® product (Avecia, Wilmington, Del.), which contains 1,2-benzisothiazolin-3-one. The Proxel® products include Proxel® BD20, Proxel® GXL, Proxel® MW200, Proxel® LV, Proxel® SE, Proxel® TN, Proxel® XL2, Proxel® DL, and Proxel® BZ.

In one embodiment, the slurry further comprises at least one dispersant. The at least one dispersant can be present in an amount effective to provide a desired dispersant effect, for example in an amount ranging from about 0.01% to about 2% by weight, relative to the total weight of the slurry, such as an amount ranging from about 0.01% to about 1% by weight. Dispersants may be chosen from any art recognized dispersants for use in pigment, paper coating or paper filling compositions. Appropriate dispersants will be readily apparent to the skilled artisan. Dispersants may be chosen from polyelectrolytes such as polyacrylates and copolymers containing polyacrylate species, for example polyacrylate salts (such as sodium, ammonium and potassium salts), sodium hexametaphosphates, polyphosphoric acid, condensed sodium phosphate, alkanolamines, and other reagents commonly used for this function. Other non-limiting examples of suitable dispersants include 2-amino-2-methyl-1-propanol, tetrasodium pyrophosphate, trisodium phosphate, tetrasodium phosphate, sodium tripolyphosphate, sodium silicate, sodium carbonate, sodium or potassium salts of weak acids, such as condensed naphthalene sulfonic acid and polymeric carboxylic acid, and water-soluble organic polymeric salts, such as sodium or ammonium polyacrylate, and polymethacrylates such as sodium or ammonium polymethacrylate.

In one embodiment, the slurry has a pH ranging from 8 to 10. To achieve the desired pH, the composition can further comprise at least one water-soluble pH modifier. Non-limiting examples of suitable pH-modifiers include sodium carbonate, amino-2-methyl-1-propanol, sodium hydroxide and ammonium hydroxide.

Kaolins can settle out of some slurry solutions, causing destabilization of the slurry. A high solids content can contribute to slurry destabilization. Accordingly, one aspect of the invention provides a composition where the slurry is stabilized. A "stabilized slurry" refers to a slurry where the kaolin does not appreciably settle out of solution over time. According to one aspect of the invention, a 250 mL slurry sample comprising calcined kaolin having at least about 58% solids is stabilized if, after one week, it exhibits a volume of settled solids of less than or equal to about 10 mL. According to another aspect of the invention, the slurry sample is stabilized if the volume of settled solids is less than or equal to about 5 mL. According to yet another aspect of the invention, the slurry sample is stabilized if the volume of settled solids is less than or equal to about 2 mL. According to yet another aspect of the invention, the slurry sample is stabilized if the volume of settled solids is less than or equal to about 1.5 mL. According to yet another aspect of the invention, the slurry sample is stabilized if the volume of settled solids is less than or equal to about 1 mL.

In another aspect of the invention, a stabilized slurry exhibits little or no syneresis, i.e. separation of liquid from a gel or slurry caused by contraction. According to one aspect of the invention, a 250 mL slurry sample comprising calcined kaolin having at least about 58% solids exhibits little or no syneresis if the slurry exhibits a volume of settled solids of less than or equal to about 10 mL. According to another aspect of the invention, a slurry sample exhibits little or no syneresis if the volume settled solids is less than or equal to about 5 mL. According to another aspect of the invention, a slurry sample exhibits little or no syneresis if the volume of settled solids is less than or equal to about 2 mL. According to yet another aspect of the invention, the slurry sample is stabilized if the volume of settled solids is less than or equal to about 1.5 mL. According to yet another aspect of the invention, the slurry sample is stabilized if the volume of settled solids is less than or equal to about 1 mL.

According to one aspect of the invention, the composition comprises a stabilized slurry comprising calcined kaolin. At least about 40% by weight of the calcined kaolin can have a particle size of at least about 1 μm, and the slurry can have a solids content of at least about 58% by weight, relative to the total weight of the slurry. The slurry can further comprise at least one thickener present in an amount effective to stabilize the slurry. In other embodiments, at least about 45% by weight, such as an amount of at least about 50% by weight, of the calcined kaolin can have a particle size of at least about 1 μm, such as a particle size of at least about 2 μm or a particle size ranging from about 1 μm to about 10 μm.

Another aspect of the present invention provides a method of preparing a slurry. In one embodiment, the method comprises:

(a) providing a calcined kaolin, wherein at least about 40% by weight of the calcined kaolin has a particle size of at least about 1 μm;

(b) combining the calcined kaolin with water; and (c) obtaining a slurry having a solids content of at least about 58% by weight, relative to the total weight of the slurry.

Effective calcining procedures include, but are not limited to, soak calcining and flash calcining. In soak calcining, a hydrous kaolin is heat treated at temperatures ranging from 500° C. to 1200° C., such as temperatures ranging from 800° C. to 1200° C., from 850-900° C., or from 900-950° C., as described herein, for a period of time (e.g., from at least 1 minute to 5 or more hours) sufficient to dehydroxylate the kaolin. In flash calcining, a hydrous kaolin is heated rapidly for a period of less than 1 second, typically less than 0.5 second.

The furnace, kiln, or other heating apparatus used to effect calcining of the hydrous kaolin may be of any known kind. Known devices suitable for carrying out soak calcining include high temperature ovens and rotary and vertical kilns. Known devices for effecting flash calcining include toroidal fluid flow heating devices, such as those described in WO 99/24360, the disclosure of which is incorporated by reference herein.

Coarse calcined (or partially calcined) kaolin particles suitable for feed in the present invention may be prepared by methods known to those skilled in the art. For example, suitable coarse feed may be obtained in a manner suggested in Sare et al., U.S. Pat. No. 6,103,005, the disclosure of which is incorporated by reference herein. For example, feeds suitable as coarse components of the present invention may be obtained by known methods from particles having a median particle size of greater than about 2.0 μm.

In one embodiment, the method further comprises introducing at least one additional ingredient prior to (c), where the at least one additional ingredient is chosen from thickeners and dispersants. In another embodiment, the method comprises adding at least one thickener and at least one dispersant prior to (c). In yet another embodiment, the method comprises adding at least one biocide prior to or after (c).

In one embodiment, the method comprises introducing at least one pH modifier prior to (c). For example, (b) can involve adjusting the pH to a value ranging from at least about 6.2 to about 7.5, such as a pH ranging from 6.2 to 7, or a pH ranging from 7 to 7.5. The adjusting can be achieved by adding at least one pH modifier as known in the art. Suitable non-limiting examples of pH modifiers include sodium carbonate, 2-amino-2-methyl-1-propanol, sodium hydroxide, and ammonium hydroxide.

The calcined kaolin can be combined with water by any method known in the art. For example, dry calcined kaolin can be blunged with water on a drill press. In one embodiment, the blunging can be performed in the presence of at least one dispersant. In another embodiment, at least one pH modifier can be added during the blunging process to maintain the pH at a value ranging from at least about 6.2 to about 7.5, or any of the levels mentioned above.

In one embodiment, prior to (c), i.e., before or after b), the pH can be adjusted to a value ranging from at least about 8 to about 10.0. The adjusting can be achieved by adding at least one pH modifier, such as those described herein, or any other pH modifier known in the art.

In one embodiment, the slurry can be screened or filtered. The screening or filtering can be accomplished by any method known in the art, such as screening through a mesh screen.

In one embodiment, the coarse calcined kaolin in the slurry has a minimal amount of fines. Often, kaolin is ground to achieve a desired particle size. It is well-known, however, that grinding produces smaller particles. Thus, in one embodiment, the calcined kaolin is not subjected to mechanical grinding to minimize the amount of fines and to ensure at least about 40% by weight of the calcined kaolin has a particle size of at least about 1 μm. Accordingly, one aspect of the present invention provides a method for preparing a slurry comprising providing calcined kaolin, at least about 40% by weight of the calcined kaolin having a particle size of at least about 1 μm, wherein the calcined kaolin has not been subjected to mechanical grinding. The non-mechanically ground calcined kaolin can then be introduced to water.

According to another aspect, the slurry comprises a minimal amount of fines, where less than or equal to about 10% by weight of the calcined kaolin has a particle size of less than about 1 μm, such as a particle size of less than about 0.5 μm. According to another aspect, less than or equal to about 15%, or about 20%, by weight of the calcined kaolin has a particle size of less than about 1 μm, such as a particle size of less than about 0.5 μm.

Another aspect of the invention provides a method of preparing a slurry having a solids content of at least about 58% by weight, relative to the weight of the slurry. The method comprises:

providing a calcined kaolin, wherein at least about 40% by weight of the calcined kaolin has a particle size of at least about 1 µm, and the calcined kaolin has not been subjected to mechanical grinding; and introducing the calcined kaolin to water.

In one aspect of the invention, the calcined kaolin has been subjected to mechanical grinding. The mechanical grinding can be performed prior to (b), i.e., before or after (a). Any art recognized grinding method can be used with the present invention, including but not limited to, for example, wet grinding using sand or ceramic media. According to one embodiment, the calcined kaolin may be prepared by light comminution, e.g., grinding or milling, of a coarse calcined kaolin. The comminution may be carried out by use of beads or granules of a ceramic or plastic, e.g., nylon, grinding or milling aid. Appropriate grinding energies will be readily apparent and easily calculated by the skilled artisan to maintain the desired particle sizes. In one embodiment, the grinding is performed to the extent that the at least about 40% by weight, such as amounts of at least about 45% or at least about 50% by weight of the calcined kaolin is at least about 1 µm.

Calcined kaolins having a coarse particle size can be useful in paint compositions. Accordingly, another aspect of the present invention provides a paint composition comprising any of the slurries described herein. In one embodiment, the paint comprises a slurry comprising calcined kaolin, wherein at least about 40%, such as amounts of at least about 45%, or at least about 50% by weight of the calcined kaolin in the slurry has a particle size of at least about 1 µm, and the slurry has a solids content of at least about 58% by weight, relative to the total weight of the slurry. In another embodiment, the slurry can further comprise at least one thickener present in an amount effective to stabilize the slurry.

Paint compositions comprising calcined kaolin and optionally at least one ingredient chosen from thickeners, dispersants, and biocides, as described herein, may additionally comprise at least one additional ingredient chosen from a polymeric binder, a primary pigment such as titanium dioxide, a secondary pigment such as calcium carbonate, silica, nephaline syenite, feldspar, dolomite, diatomaceous earth, and flux-calcined diatomaceous earth. For water-based versions of such paint compositions, any water-dispersible binder, such as polyvinyl alcohol (PVA) and acrylics may be used. Paint compositions of the present invention may also comprise other conventional additives, including, but not limited to, surfactants, thickeners, defoamers, wetting agents, dispersants, solvents, and coalescents.

The calcined kaolin products of the invention can be used in coating compositions in which any one of these characteristics are desired. Products of the invention may also be useful wherever kaolins are used, such as in making filled plastics, rubbers, sealants, cables, ceramic products, cementitious products, and paper products and paper coatings.

The present invention can be used in the production of all paper grades, from ultra lightweight coated paper to coated or filled board. Paper and paperboard products can comprise a coating, which can improve the brightness and opacity of the finished paper or board.

The inventive products can also serve as extenders, allowing the partial replacement of expensive titanium dioxide pigments without unacceptable loss of opacity or tint strength. The extender material can be used in paper, polymers, paints and the like or as a coating pigment or color ingredient for coating of paper, paper board, plastic papers and the like.

Thus, one aspect of the present invention provides a method of making a coated paper or coated paper board. The method comprises coating a fibrous substrate with a slurry, as described herein. In one embodiment the slurry comprises calcined kaolin wherein at least about 40% by weight of the calcined kaolin has a particle size of at least about 1 µm, and the slurry has a solids content of at least about 58% by weight, relative to the total weight of the slurry.

Paper coatings according to the present invention can include, in addition to the calcined kaolin as described above, materials generally used in the production of paper coatings and paper fillers. The compositions can include a binder and a pigment, such as $TiO_2$. The coatings according to the present invention may optionally include other additives, including, but not limited to, dispersants, cross linkers, water retention aids, viscosity modifiers or thickeners, lubricity or calendering aids, antifoamers/defoamers, gloss-ink hold-out additives, dry or wet rub improvement or abrasion resistance additives, dry or wet pick improvement additives, optical brightening agents or fluorescent whitening agents, dyes, biocides, leveling or evening aids, grease or oil resistance additives, water resistance additives and/or insolubilisers.

Any art recognized binder may be used in the present invention. Exemplary binders include, but are not limited to, adhesives derived from natural starch obtained from a known plant source, for example, wheat, maize, potato or tapioca; synthetic binders, including styrene butadiene, acrylic latex, vinyl acetate latex, or styrene acrylic; casein; polyvinyl alcohol; polyvinyl acetate; or mixtures thereof.

Paper coatings have very different binder levels depending upon the type of printing to be used with the coated paper product. Appropriate binder levels based upon the desired end product would be readily apparent to the skilled artisan. Binder levels are controlled to allow the surfaces to receive ink without disruption. The latex binder levels for paper coatings generally range from about 3% to about 30%. In one embodiment according to the present invention, the binder is present in the paper coating in an amount of from about 3% to about 10%. In another embodiment according to the present invention, the binder is present in the coating in an amount ranging from about 10% to about 30% by weight.

The invention will be further clarified by the following non-limiting examples, which are intended to be purely exemplary of the invention.

EXAMPLES

Example 1

The particle size distribution of a 10,000 g sample of coarse particle calcined kaolin 'A' is summarized in Table I. From Table 1, it can be observed that at least about 40% by weight of calcined kaolin "A" has a particle size of at least about 1 µm. The calcined kaolin was obtained as Glomax® LL (Imerys). The calcined kaolin was slurried with 5,268 g of water agitation. The pH of the resulting slurry was first adjusted to 6.35 by the addition of 2-amino-2-methyl-1-propanol (AMP-95®, Dow Chemical Company, Midland, Mich.), followed by agitation for five minutes. A solids content of 64.9% was achieved. The pH of the slurry was then further adjusted to 8.90 with additional 2-amino-2-methyl-1-propanol.

TABLE I

Summary of Particle Size Distribution

| Sample | Particle Size Distribution, μm | | | |
|---|---|---|---|---|
| | 10 μm | 5 μm | 2 μm | 1 μm |
| A | 99 | 92 | 66 | 42 |
| B | 98 | 85 | 59 | 44 |

Slurry "A-1" was prepared by adding to 3300 g of Slurry "A", 0.55% thickener (10 parts Acrosol® SCT-275 and 1 part Acrosol® TT-935) by weight, relative to the total weight of the slurry, followed by 30 minutes of agitation. The product was screened over a 200 mesh screen.

Slurry "A-2" was prepared by adding to 3300 g of Slurry "A", 0.14% thickener (Acrosol® DR-73) by weight, relative to the total weight of the slurry. After 30 minutes of agitation, the product was screened over a 200 mesh screen.

The Brookfield viscosities of the "A," "A-1," and "A-2" slurries are summarized in Table II.

TABLE II

Summary of Slurry Properties

| Sample | Solids % | pH | Brookfield Viscosity | | | |
|---|---|---|---|---|---|---|
| | | | 10 RPM | 20 RPM | 50 RPM | 100 RPM |
| A | 64.9 | 8.80 | 70 | 60 | 62 | 76 |
| A-1 | 64.2 | 8.65 | 1030 | 850 | 344 | 227 |
| A-2 | 64.2 | 9.01 | 1110 | 750 | 446 | 327 |

The relative stability of slurries "A-1" and "A-2" to settling is summarized in Table III. All observations were made by using 250 mL slurry samples placed in a 250 mL graduated volumetric cylinder. As can be seen in Table III, both slurries "A-1" and "A-2" showed good slurry stability, with slurry "A-2" exhibiting exceptional stability over the entire testing period.

TABLE III

Summary of Stability to Settling

| Sample | Time, Weeks | | | |
|---|---|---|---|---|
| | 1 | 2 | 3 | 4 |
| A-1 - Syneresis | — | 3 mL | 8 mL | 20 mL |
| A-1 - Settled | 1 mL | 10 mL | 20 mL | 32 mL |
| A-2 - Syneresis | — | — | — | — |
| A-2 - Settled | — | 2 mL | 3 mL | 8 mL |

Comparative paint studies were performed with paints prepared with the "A-1" and "A-2" slurries versus a paint prepared with a non-slurried, coarse particle calcined kaolin 'A'. The paint formulation for a 44%, 55%, and 71% PVC formulation is shown as pounds per 100 gallons of paint and percent by weight, as summarized in Tables IV-IX.

TABLE IV

44% PVC Formulations (Pounds Per 100 Gallons of Paint)

| | |
|---|---|
| Water | 290.0 |
| KTPP (potassium tripolyphosphate) | 1.8 |
| Tamol ® 731 (nonionic polymeric dispersant) | 7.9 |
| Igepal CO-610 (nonylphenol ethoxylate) | 4.0 |
| Colloids 681F | 3.0 |
| Titanium Dioxide (R-706) | 143.6 |
| Gamaco (CaCO₃) | 96.3 |
| Calcined Kaolin[1] | 148.9 |
| Natrosol 250HR (hydroxyethylcellulose) | 4.0 |
| Disperse to a 4 NS,[2] then add the following while slowly mixing | |
| Ucar 379 (vinyl/acrylic) | 338.6 |
| Ethylene Glycol | 24.8 |
| Texanol (ester alcohol) | 9.9 |
| Water | 45.7 |
| Weight Solids | 52.7% |
| Volume Solids | 36.7% |

[1]Dry basis
[2]Hegman national standard

TABLE V

44% PVC Formulations (% by weight)

| | |
|---|---|
| Water | 30.00 |
| KTPP | 0.16 |
| Tamol 731 | 0.71 |
| Igepal CO-610 | 0.36 |
| Colloids 681F | 0.27 |
| Titanium Dioxide (R-706) | 12.84 |
| Gamaco (CaCO₃) | 8.61 |
| Calcined Kaolin[1] | 13.32 |
| Natrosol 250HR | 0.36 |
| Ucar 379 | 30.27 |
| Ethylene Glycol | 2.22 |
| Texanol | 0.89 |

[1]Dry basis

TABLE VI

55% PVC Formulations (Pounds per 100 Gallons of Paint)

| | |
|---|---|
| Water | 342.4 |
| KTPP | 1.8 |
| Tamol 731 | 8.0 |
| Igepal CO-610 | 4.0 |
| Colloids 681F | 3.0 |
| Titanium Dioxide (R-706) | 113.0 |
| Gamaco (CaCO₃) | 115.0 |
| Calcined Kaolin[1] | 204.7 |
| Natrosol 250HR | 4.5 |
| Disperse to a 4 NS,[2] then add the following while slowly mixing. | |
| Ucar 379 | 249.9 |
| Ethylene Glycol | 25.0 |
| Texanol | 10.0 |
| Water | 55.0 |
| Weight Solids | 51.4% |
| Volume Solids | 34.0% |

[1]Dry basis
[2]Hegman national standard

TABLE VII

55% PVC Formulations (% by weight)

| | |
|---|---|
| Water | 34.97 |
| KTPP | 0.16 |
| Tamol 731 | 0.7 |
| Igepal CO-610 | 0.35 |
| Colloids 681F | 0.26 |
| Titanium Dioxide (R-706) | 9.94 |
| Gamaco (CaCO₃) | 10.12 |
| Calcined Kaolin[1] | 18.02 |
| Natrosol 250HR | 0.40 |
| Ucar 379 | 21.99 |

TABLE VII-continued

55% PVC Formulations (% by weight)

| | |
|---|---|
| Ethylene Glycol | 2.20 |
| Texanol | 0.88 |

[1] Dry basis

TABLE VIII

71% PVC Formulations (Pounds per 100 Gallons of Paint)

| | |
|---|---|
| Water | 328.8 |
| KTPP | 2.1 |
| Tamol 731 | 8.0 |
| Igepal CO-630 | 3.0 |
| AMP-95 | 2.0 |
| Drew L-475 (foam control agent) | 4.0 |
| Titanium Dioxide (R-706) | 68.3 |
| Calwhite (CaCO$_3$) | 124.6 |
| Calcined Kaolin[1] | 206.1 |
| Natrosol Plus 330 | 7.5 |
| Disperse to a 4 NS,[2] then add the following while slowly mixing. | |
| Ucar 379 | 124.6 |
| Ethylene Glycol | 10.0 |
| Texanol | 12.0 |
| Water | 201.2 |
| Weight Solids | 44.1% |
| Volume Solids | 26.0% |

[1] Dry basis
[2] Hegman national standard

TABLE IX

71% PVC Formulations (% by weight)

| | |
|---|---|
| Water | 48.1 |
| KTPP | 0.2 |
| Tamol 731 | 0.7 |
| Igepal CO-630 | 0.3 |
| AMP-95 | 0.2 |
| Drew L-475 | 0.4 |
| Titanium Dioxide (R-706) | 6.2 |
| Calwhite (CaCO$_3$) | 11.3 |
| Calcined Kaolin[1] | 18.3 |
| Natrosol 250HR | 0.7 |
| Ucar 379 | 11.3 |
| Ethylene Glycol | 0.9 |
| Texanol | 1.1 |

[1] Dry basis

The comparative properties for paint formulation are summarized in Tables X-XII. It can be seen that the use of a high solids content slurry has little effect on the gloss, sheen, or other properties of any of the paints. Thus, the high solids content slurry can produce a paint having optimal properties while achieving a higher density of calcined kaolin. This is advantageous at least because the lower volumes of the same amount of calcined kaolin can be transported to and handled by paint manufacturers.

TABLE X

44% PVC Paint Film Property Results

| | Calcined Kaolin "A" (comparative) | Calcined Kaolin Slurry "A-1" | Calcined Kaolin Slurry "A-1" |
|---|---|---|---|
| 60° Gloss | 2.9 | 3.3 | 3.3 |
| 85° Sheen | 6.8 | 8.1 | 8.2 |
| L | 95.3 | 95.3 | 95.1 |
| a | −1.0 | −1.0 | −1.0 |
| b | 1.1 | 1.1 | 1.1 |
| ASTM-E-313 White | 86.3 | 86.5 | 86.1 |
| ASTM-E-313 Yellow | 1.2 | 1.2 | 1.2 |
| Brightness | 89.8 | 89.8 | 89.5 |
| Contrast Ratio | 95.0 | 95.0 | 94.6 |
| Blue Tint | | | |
| L | 77.0 | 77.4 | 77.2 |
| a | −11.2 | −11.0 | −11.1 |
| b | −20.6 | −20.2 | −20.5 |
| ΔL | — | −0.4 | −0.2 |
| Δa | — | −0.2 | −0.1 |
| Δb | — | −0.4 | −0.3 |
| ΔE | — | 0.6 | 0.4 |

TABLE XI

55% PVC Paint Film Property Results

| | Calcined Kaolin "A" | Calcined Kaolin Slurry "A-1" | Calcined Kaolin Slurry "A-1" |
|---|---|---|---|
| 60° Gloss | 3.0 | 3.1 | 3.0 |
| 85° Sheen | 8.2 | 8.1 | 7.8 |
| L | 95.2 | 94.9 | 94.8 |
| a | −1.0 | −1.0 | −1.0 |
| b | 1.3 | 1.3 | 1.3 |
| ASTM-E-313 White | 84.6 | 84.0 | 83.9 |
| ASTM-E-313 Yellow | 1.7 | 1.7 | 1.7 |
| Brightness | 89.4 | 88.7 | 88.6 |
| Contrast Ratio | 96.2 | 95.8 | 95.9 |
| Blue Tint | | | |
| L | 77.6 | 77.3 | 77.0 |
| a | −11.0 | −11.0 | −11.1 |
| b | −19.7 | −19.7 | −20.0 |
| ΔL | — | 0.3 | 0.6 |
| Δa | — | 0.0 | 0.1 |
| Δb | — | 0.0 | 0.3 |
| ΔE | — | 0.3 | 0.7 |

TABLE XII

71% PVC Paint Film Property Results

| | Calcined Kaolin "A" | Calcined Kaolin Slurry "A-1" | Calcined Kaolin Slurry "A-1" |
|---|---|---|---|
| 60° Gloss | 2.9 | 2.9 | 2.8 |
| 85° Sheen | 3.8 | 2.9 | 2.9 |
| L | 95.4 | 94.9 | 94.9 |
| a | −0.9 | −0.9 | −0.9 |
| b | 1.5 | 1.6 | 1.5 |
| ASTM-E-313 White | 83.9 | 82.5 | 82.7 |
| ASTM-E-313 Yellow | 1.9 | 2.1 | 2.1 |
| Brightness | 89.4 | 88.4 | 88.5 |
| Contrast Ratio | 96.0 | 95.6 | 95.8 |

TABLE XII-continued

71% PVC Paint Film Property Results

|   | Calcined Kaolin "A" | Calcined Kaolin Slurry "A-1" | Calcined Kaolin Slurry "A-1" |
|---|---|---|---|
|   | Blue Tint | | |
| L | 77.0 | 76.5 | 76.3 |
| a | −11.1 | −11.2 | −11.3 |
| b | −20.1 | −20.2 | −20.5 |
| ΔL | — | 0.5 | 0.7 |
| Δa | — | 0.1 | 0.2 |
| Δb | — | 0.1 | 0.4 |
| ΔE | — | 0.5 | 0.8 |

A larger scale sample of slurry "A-2" was prepared at 62.6% solids. A comparative paint study was performed with a paint containing slurry "A-2" versus a paint containing the non-slurried, coarse particle calcined kaolin "A" in a conventional 71% PVC formulation. Table XIII summarizes the pigment components. The results of the comparative study, summarized in Table XIV, shows that the paint prepared with slurry "A-2" provided an similar pigment system to the paint prepared with calcined kaolin "A" on a dry basis.

TABLE XIII

71% PVC Paint Formulation Summary of Pigment Components

| $TiO_2$ | 68.3 | 68.3 |
|---|---|---|
| $CaCO_3$ | 124.6 | 124.6 |
| Calcined Kaolin | 206.1 | — |
| Calcined Kaolin Slurry[1] | — | 329.2 (206.1)[2] |

[1]62.6% solids slurry
[2]Dry Basis

TABLE XIV

Paint Film Property Results

|   | Calcined Kaolin | Calcined Kaolin Slurry "A-2" |
|---|---|---|
| 60° Gloss | 2.8 | 2.8 |
| 85° Sheen | 2.0 | 3.7 |
| L (lightness) | 95.7 | 95.4 |
| a | −0.9 | −0.9 |
| b | 1.6 | 1.6 |
| ASTM-E-313 White | 83.9 | 83.2 |
| ASTM-E-313 Yellow | 2.1 | 2.1 |
| Brightness | 89.9 | 89.3 |
| Contrast Ratio | 96.8 | 96.0 |
|   | Blue Tint | |
| L | 80.4 | 79.8 |
| a | −12.0 | −11.9 |
| b | −16.3 | −16.7 |
| ΔL | — | 0.6 |
| Δa | — | −0.1 |
| Δb | — | 0.4 |
| ΔE | — | 0.7 |

$(\Delta E = [(\Delta L)^2 + (\Delta a)^2 + (\Delta b)^2]^{1/2})$

Example 2

The particle size distribution of a coarse particle calcined kaolin "B" is also summarized in Table 1. From Table 1, it can be observed that at least about 40% by weight of calcined kaolin "B" has a particle size of at least about 1 μm. Moreover, calcined kaolin "B" has a bimodal distribution. 3400 g of calcined kaolin "B" was slurried with 1830 g of water by agitation. The pH of the resulting slurry was first adjusted to 7.45 by the addition of 2-amino-2-methyl-1-propanol, followed by agitation for 11 minutes. A solids content of 64.4% was achieved. The pH of the slurry was then further adjusted to 9.00 with additional 2-amino-2-methyl-1-propanol.

Slurry "B-1" was prepared by adding 0.11% thickener (Acrosol® DR-73). The slurry was agitated for 5 minutes.

The Brookfield viscosities of the "B" and "B-1" slurries are summarized in Table XV.

TABLE XV

Summary of Slurry Properties

|   |   |   | Brookfield Viscosity | | | |
|---|---|---|---|---|---|---|
| Sample | Solids % | pH | 10 RPM | 20 RPM | 50 RPM | 100 RPM |
| B | 64.4 | 9.00 | 104 | 84 | 89 | 120 |
| B-1 | 64.4 | 8.26 | 1180 | 810 | 530 | 400 |

The relative stability of slurry "B-1" to settling is summarized in Table XVI. All observations were made on a 250 mL slurry sample placed in a 250 mL graduated volumetric cylinder. From Table XVI, it can be seen that slurry "B-1" exhibits exceptionally good stability over the entire testing period.

TABLE XVI

Summary of Stability to Settling

|   | Time, Days | | | |
|---|---|---|---|---|
| Sample | 2 | 5 | 7 | 14 |
| B-1 - Syneresis | 1 mL | 3 mL | 5 mL | 11 mL |
| B-1 - Settled Solids | — | — | — | — |

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

What is claimed is:

1. A composition comprising a slurry comprising calcined kaolin, wherein at least about 40% by weight of the calcined kaolin has a particle size of at least about 1 μm, at least about 40% by weight of the calcined kaolin has a particle size of at least about 2 μm, the slurry has a solids content of at least about 58% by weight, relative to the total weight of the slurry, and the calcined kaolin has not been subjected to mechanical grinding.

2. The composition according to claim 1, wherein at least about 40% by weight of the calcined kaolin has a particle size ranging from about 1 μm to about 10 μm.

3. The composition according to claim 1, wherein at least about 45% by weight of the calcined kaolin has a particle size of at least about 1 μm.

4. The composition according to claim 1, wherein at least about 50% by weight of the calcined kaolin has a particle size of at least about 1 μm.

5. The composition according to claim 1, wherein the slurry has a solids content of at least about 60% by weight, relative to the total weight of the slurry.

6. The composition according to claim 1, wherein the slurry further comprises at least one thickener.

7. The composition according to claim 6, wherein the at least one thickener is chosen from cellulosic thickeners, montmorillonite, smectite clays, hydrophobically modified ethoxylated urethanes, polyacrylates, polyvinyl pyrrolidone, sodium alginate, xanthan gum, silica thickeners, sodium magnesium silicate, acrylic acid copolymers, and nonionic hydrophobically modified polyethers.

8. The composition according to claim 7, wherein the at least one thickener is a cellulosic thickener chosen from alkyl celluloses, carboxymethyl celluloses, ethylhydroxyethyl celluloses, hydroxymethyl celluloses, hydroxyethyl celluloses, and hydroxypropyl celluloses.

9. The composition according to claim 6, wherein the at least one thickener is present in an amount effective to stabilize the slurry.

10. The composition according to claim 9, wherein the at least one thickener is present in an amount ranging from about 0.01% to about 4% by weight, relative to the total weight of the slurry.

11. The composition according to claim 10, wherein the at least one thickener is present in an amount ranging from about 0.01% to about 2% by weight, relative to the total weight of the slurry.

12. The composition according to claim 1, wherein the slurry further comprises at least one dispersant.

13. The composition according to claim 12, wherein the at least one dispersant is present in an amount ranging from about 0.01% to about 2% by weight, relative to the total weight of the slurry.

14. The composition according to claim 13, wherein the at least one dispersant is present in an amount ranging from about 0.01% to about 1% by weight, relative to the total weight of the slurry.

15. The composition according to claim 12, wherein the at least one dispersant is chosen from polyelectrolytes, sodium salts of weak acids, potassium salts of weak acids, and water-soluble organic polymeric salts.

16. The composition according to claim 15, wherein the at least one dispersant is a polyelectrolyte chosen from polyacrylates and copolymers containing polyacrylates.

17. The composition according to claim 12, wherein the at least one dispersant is chosen from 2-amino-2-methyl-1-propanol, polyacrylates, sodium hexametaphosphates, polyphosphoric acid, condensed sodium phosphate, alkanolamines, tetrasodium pyrophosphate, trisodium phosphate, sodium hexametaphosphate, tetrasodium phosphate, sodium tripolyphosphate, sodium silicate, sodium carbonate, sodium salts of naphthalene sulfonic acid, potassium salts of naphthalene sulfonic acid, sodium salts of polymeric carboxylic acid, potassium salts of polymeric carboxylic acid, and polymethacrylates.

18. The composition according to claim 1, wherein the slurry further comprises at least one biocide.

19. The composition according to claim 18, wherein the at least one biocide is present in an amount ranging from about 0.01% to about 1% by weight, relative to the total weight of the slurry.

20. The composition according to claim 18, wherein the at least one biocide is chosen from quaternary ammonium compounds, organosulphur compounds, and halogen-containing compounds.

21. The composition according to claim 18, wherein the at least one biocide is chosen from metaborate, sodium dodecylbenzene sulphonate, sodium benzoate, benzisothiazolin, isothiazolin, thione, glutaraldehyde, bromonitropropanediol, bromohydroxyacetophenone, dibromodicyanobutane, sodium orthophenylphenate, dodecylguanidine hydrochloride, oxazolidines, adamantanes, hydantoins, dibromonitrilopropionamide, bromonitrostyrene, methylenebisthiocyanate, tetrakis hydroxymethyl phosphonium sulfate, sodium dimethyldithiocarbamate, and chloromethylphenol.

22. The composition according to claim 1, wherein the slurry has a pH ranging from about 8 to about 10.

23. The composition according to claim 1, wherein the slurry further comprises at least one pH modifier.

24. The composition according to claim 23, wherein the at least one pH modifier is chosen from sodium carbonate, amino-2-methyl-1-propanol, sodium hydroxide and ammonium hydroxide.

25. The composition according to claim 1, wherein the calcined kaolin comprises mullite.

26. A method of preparing a slurry comprising: (a) providing a calcined kaolin, wherein at least about 40% by weight of the calcined kaolin has a particle size of at least about 1 µm, at least about 40% by weight of the calcined kaolin has a particle size of at least about 2 µm, and the calcined kaolin has not been subjected to mechanical grinding; (b) combining the calcined kaolin with water; and (c) obtaining a slurry having a solids content of at least about 58% by weight, relative to the total weight of the slurry.

27. The method according to claim 26, further comprising introducing at least one dispersant prior to (c).

28. The method according to claim 26, further comprising introducing at least one thickener prior to (c).

29. The method according to claim 28, wherein the thickener is introduced in an amount effective to stabilize the slurry.

30. The method according to claim 26, further comprising introducing at least one pH modifier prior to (c).

31. A method of preparing a slurry having a solids content of at least about 58% by weight, relative to the weight of the slurry, said method comprising: providing a calcined kaolin, wherein at least about 40% by weight of the calcined kaolin has a particle size of at least about 1 µm, at least about 40% by weight of the calcined kaolin has a particle size of at least about 2 µm, and the calcined kaolin has not been subjected to mechanical grinding; and introducing the calcined kaolin to water.

32. A paint comprising a slurry comprising calcined kaolin, wherein at least about 40% by weight of the calcined kaolin has a particle size of at least about 1 µm, at least about 40% by weight of the calcined kaolin has a particle size of at least about 2 µm, the slurry has a solids content of at least about 58% by weight, relative to the total weight of the slurry, and the calcined kaolin has not been subjected to mechanical grinding.

33. A method of making a coated paper or coated paper board comprising: coating a fibrous substrate with slurry, the slurry comprising calcined kaolin wherein at least about 40% by weight of the calcined kaolin has a particle size of at least about 1 µm, at least about 40% by weight of the calcined kaolin has a particle size of at least about 2 µm, the slurry has a solids content of at least about 58% by weight, relative to the total weight of the slurry, and the calcined kaolin has not been subjected to mechanical grinding.

* * * * *